United States Patent [19] [11] Patent Number: 5,082,073
Stadler et al. [45] Date of Patent: Jan. 21, 1992

[54] ELECTRONIC BALANCE WITH PARALLEL GUIDE AND SCALE ON TOP

[75] Inventors: Eberhard Stadler; Matthias Eger, both of Göttingen, Fed. Rep. of Germany

[73] Assignee: Sartorius AG, Göttingen, Fed. Rep. of Germany

[21] Appl. No.: 605,415

[22] Filed: Oct. 30, 1990

[30] Foreign Application Priority Data

Nov. 2, 1989 [DE] Fed. Rep. of Germany ....... 3936364

[51] Int. Cl.$^5$ .......................... G01G 7/00; G01G 3/08; G01G 21/24
[52] U.S. Cl. .................... 177/212; 177/229; 177/255
[58] Field of Search ................. 177/212, 229, 255

[56] References Cited

U.S. PATENT DOCUMENTS

| 4,276,949 | 7/1981 | Knothe et al. | 177/212 |
| 4,674,582 | 6/1987 | Kunz | 177/212 X |
| 4,722,409 | 2/1988 | Kunz | 177/212 |
| 4,799,561 | 1/1989 | Komoto | 177/229 |
| 4,813,505 | 3/1989 | Sodler | 177/212 |
| 4,938,300 | 7/1990 | Kunz | 177/212 X |

Primary Examiner—George H. Miller, Jr.
Attorney, Agent, or Firm—Eric P. Schellin

[57] ABSTRACT

An electronic balance with a system carrier (1) fixed to the housing, a load receiver (2) with two guide rods (3/4) which function as parallel guide, connect the load receiver to the system carried in a vertically movable manner, with four protruding arms (5, 6) which are fastened to the load receiver (2) and carry supports points (7, 8, 9, 10) for a balance scale on their ends and with a low-travel measured value receiver (14, 15) which is loaded either directly by the force of weight acting on the balance scale or with the interpositioning of a translation lever (11). The protruding arms (5, 6) comprise a central recess (19, 20) in front of their ends (17, 18) so that an upper web (21, 23) and a lower web (22, 24) remain and form a parallel guide for the particular support point (7, 8, 9, 10) of the balance scale. Each of the four support points (7, 8, 9, 10) of the balance scale is associated with a wire strain gauge (27, 28, 29, 30) located on one of the associated webs (21, 23). These four or eight wire strain gauges (27, 28, 29, 30) are arranged in such a manner on the webs (21, 23) that they are all expanded, stressed upon an approximately central loading of the balance scale. These four wire strain gauges (27, 28, 29, 30) are wired to two half bridges and the output signals of the two half bridges are added with presettable values to the output signal of the measured value receiver (14, 15).

10 Claims, 4 Drawing Sheets

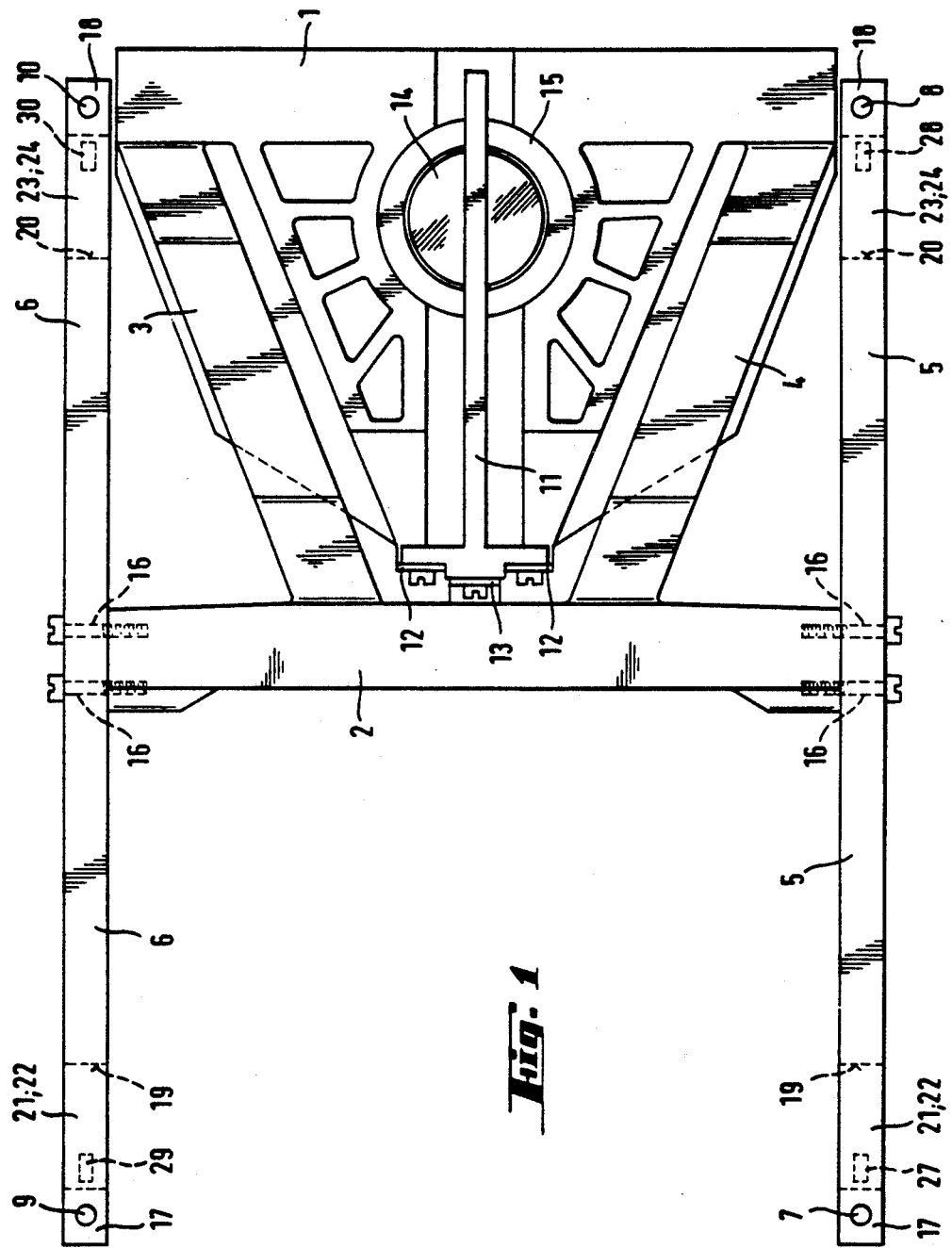

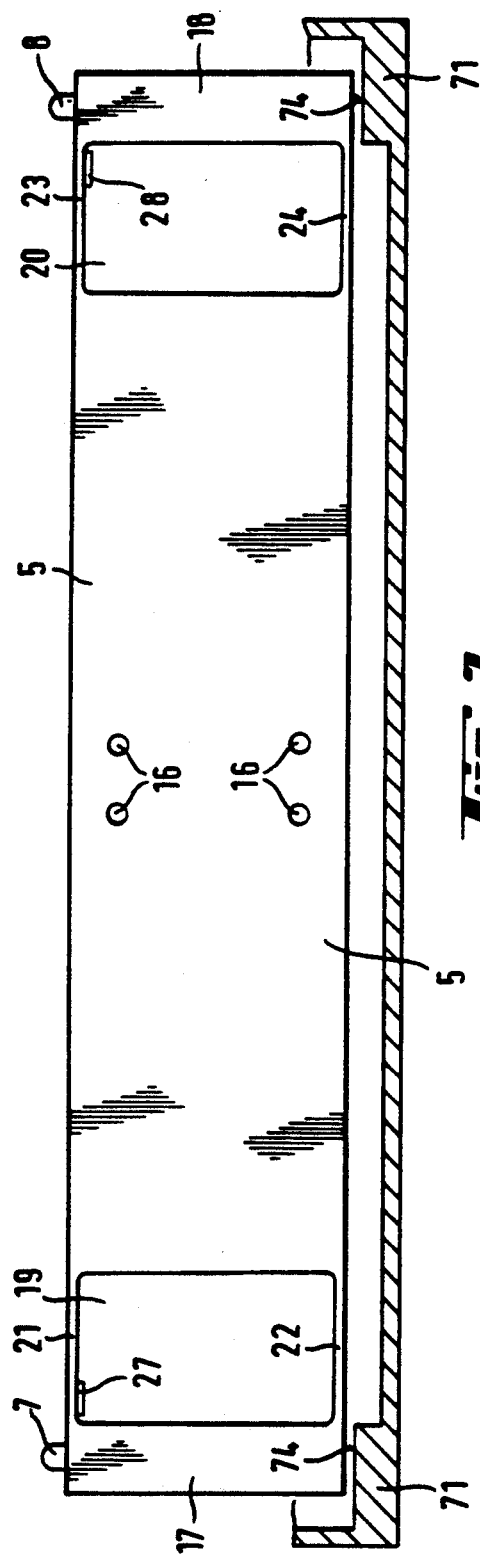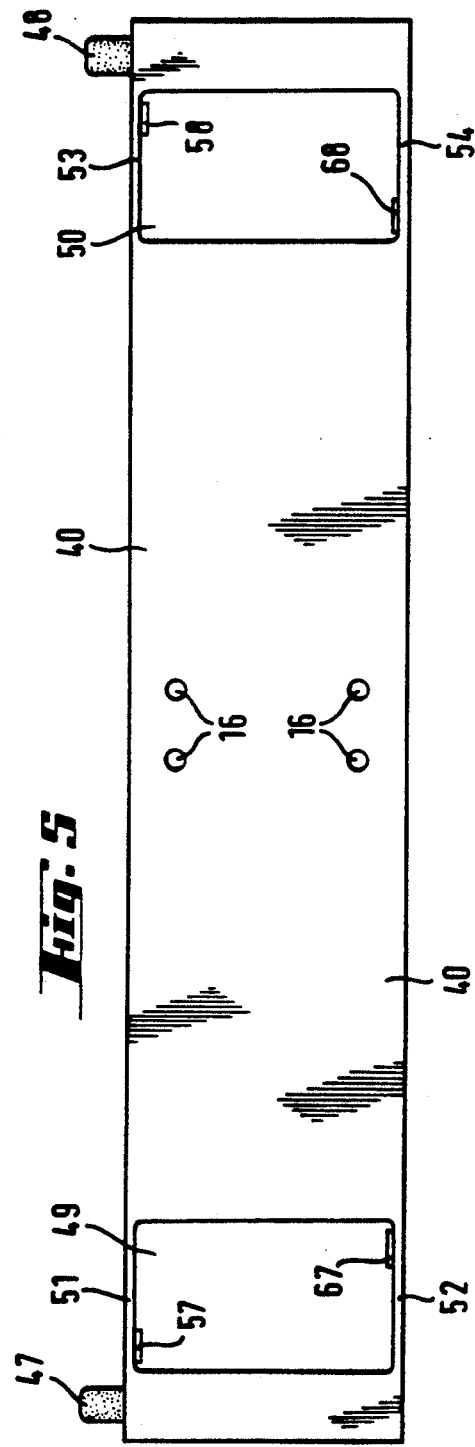

ELECTRONIC BALANCE WITH PARALLEL GUIDE AND SCALE ON TOP

BACKGROUND OF THE INVENTION

The invention relates relative to an electronic balance with a scale on top: a system carrier fixed to the housing: a load receiver with two guide rods. They function as parallel guides, connecting the load receiver to the system carried in a vertically movable manner, with four protruding arms which are fastened to the load receiver and carry support points for a balance scale on their ends and with a low-travel measured value receiver which is loaded either directly by the force of weight acting on the balance scale or with the interpositioning of a translation lever.

Balances of this type are known e.g. from U.S. Pat. No. 4,813,505. The corner-load adjustment of these balances generally takes place by means of the removal of material in the area of the guide-rod articulations or by means of mechanical adjusting elements which vary the height of at least one of the guide-rod articulations. This corner-load adjustment is expensive to manufacture. In the case of the removal of material, there is the additional danger that too much material is removed inadvertently, which is very difficult to correct.

Furthermore, U.S. Pat. No. 4,150,729 teaches that the balance scale can be supported on four parallel guides, each of which is designed in one piece, and that a transverse beam with four wire strain gauges can be provided between the parallel-guide rods as a measured value receiver. The corner-load adjustment takes place thereby also by means of a removal of material, so that the same disadvantages mentioned above result.

Furthermore, EP 0 332 213 teaches that parallel-guided members for the transmission of force can be located in the four corners in a platform balance and two members for the transmission of force can be connected to one another at a time and to a transmission lever. The corner-load adjustment takes place hereby by means of varying the height of one of the guide-rod articulations in each member for the transmission of force, which likewise results in an undue expense for manufacture and adjustment.

Furthermore, DE-PS 30 03 862 and EP 055 633 teach that the mechanical adjustment of the corner load can be replaced by a corner-load sensor and an electronic correction of corner load. However constructive embodiments are shown here only for balance scales with a central mounting.

SUMMARY OF THE INVENTION

The invention has the problem of further developing a balance of the initially mentioned type in such a manner that the expense for the corner-load adjustment is reduced and at that same time the possibility of an additional overload safety is created.

The invention solves this problem in a first variant in that the protruding arms comprise a central recess in front of their ends so that an upper web and a lower web remain and form a parallel guide for the particular support point of the balance scale. Each of the four support points of the balance scale is associated with a wire strain gauge located on one of the associated webs. These four wire strain gauges are arranged in such a manner on the webs that they are all stressed or all compressed upon an approximately central loading of the balance scale. These four wire strain gauges are wired to two half bridges. The output signals of the two half bridges are added with presettable values to the output signal of the measured value receiver.

This is achieved in a second variant in that the protruding arms comprise a central recess in front of their ends so that an upper web and a lower web remain and form a parallel guide for the particular support point of the balance scale. Each of the four support points of the balance scale is associated with two wire strain gauges located on one of the associated webs. These eight wire strain gauges are arranged in such a manner on the webs that they are all stressed or all compressed upon an approximately central loading of the balance scale. These eight wire strain gauges are wired to two full bridges. The output signals of the two full bridges are added with presettable values to the output signal of the measured value receiver.

Thus, the four protruding arms for receiving the balance scale, which are present in any case, are expanded to a corner-load sensor by means of the inclusion of the central recess and the wire strain gauges. The expense for the wire strain gauges is minimized in that the wire strain gauges are used only in one direction of loading. The use of the customary additional wire strain gauges which are used in the opposing direction of loading is abandoned.

The resiliency of the protruding arms resulting from the suggested design can be used at the same time as a resilient overload safety means without additional mechanical components being required. As a result, the protruding arms fulfill both the function of the balance scale carrier as well as the function of the corner-load sensor and also the function of the overload safety means.

BRIEF DESCRIPTION OF THE INVENTION

The invention is described in the following with reference made to the schematic figures.

FIG. 1 shows a top view of the weighing system.

FIG. 2 shows a side view of a cross traverse with two support points for the balance scale.

FIG. 5 shows a side view of a cross traverse in a second embodiment.

DETAILED DESCRIPTION OF THE INVENTION

Figure 3:
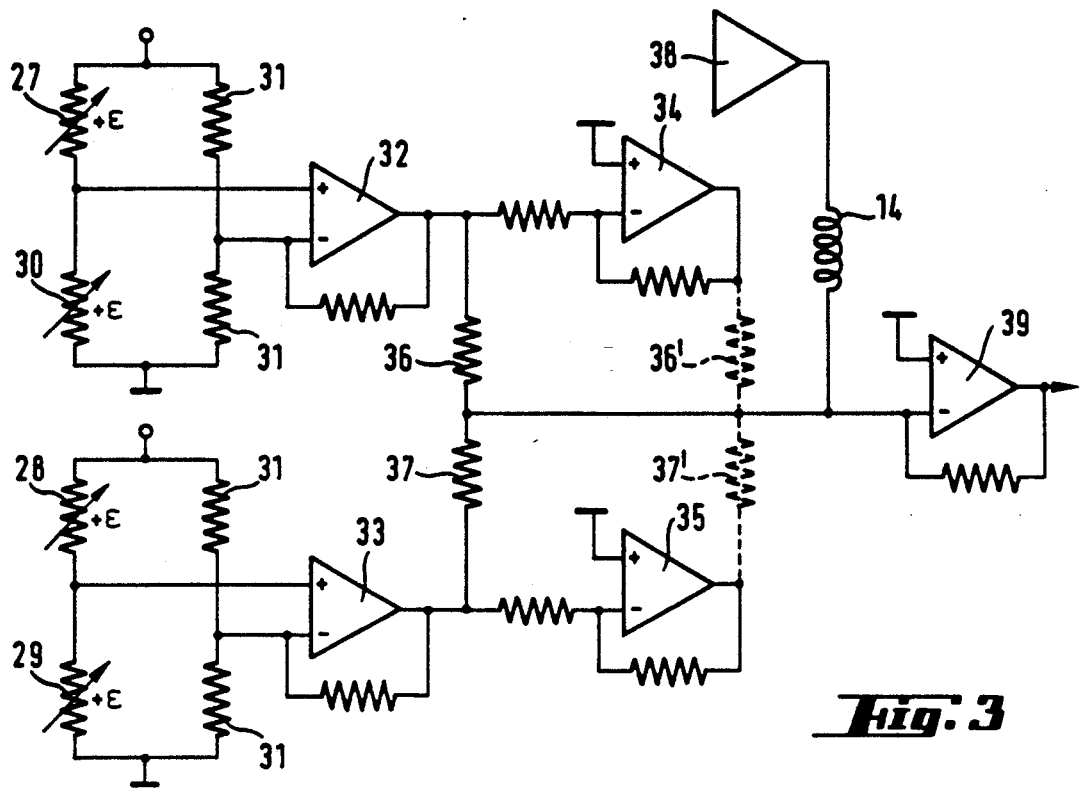
FIG. 3 shows the electric circuitry in a first embodiment.

The weighing system shown in a top view in FIG. 1 consists of a system carrier 1 fixed to the housing, to which carrier two upper guide rod arms 3, 4 are fastened. The other ends of upper guide rod arms 3, 4 are connected to load receiver 2. The two guide rod arms 3, 4 together form the upper guide rod. In the same manner, two lower guide rod arms which cannot be seen in the top view connect load receiver 2 to system carrier 1. A parallel guide for load receiver 2 is produced in this manner in a known fashion. Four protruding arms 5, 6 are fastened laterally to load receiver 2, whereby each two protruding arms are combined to a cross traverse. Protruding arms 5, 6 carry four support points 7, 8, 9, 10 on their ends for the balance scale (not shown). These cross traverses are described in more detail below. FIG. 1 also shows a translation lever 11, which is pivotably mounted by spring joints 12 to system carrier 1. Translation lever 11 represents a two-armed lever. The several millimeters shorter lever arm extends to coupling element 13, which transfers the weight forces of the material to be weighed which are exerted on load receiver 2 via balance-scale support points 7, 8, 9, 10 and protruding arms 5, 6 in an articulated manner onto translation lever 11. The longer lever arm extends to coil 14, which is located in the air gap of permanent magnet 15 and generates the counteracting force upon a flow of current. This counteracting force is regulated in balances in accordance with the principle of the electromagnetic compensation of force in a known manner by a position sensor in such a manner that an equilibrium with the force of the weight of the material to be weighed is precisely set.

The cross traverse which forms the two protruding arms 5 is shown in a side view in FIG. 2. Four holes 16 are present for fastening to load receiver 2. A recess 19 is located shortly before end 17 of the cross traverse with support point 7 for the balance scale, which recess is so large that only a relatively thin web 21 and 22 remains above and below. These two webs 21 and 22 form a parallel guide for end part 17 and therewith for support point 7 for the balance scale. The thickness of the two webs 21, 22 is dimensioned so that in the case of a maximum load on the balance scale, a slight deflection of support point 7 of e.g. 1 mm results. The expansion which arises thereby on the bottom of web 21 is converted by wire strain gauge 27 into an electric signal. The side of the cross traverse located on the right in FIG. 2 is designed in a corresponding manner: the two webs 23, 24 are formed by recess 20 shortly before end 18, which carries support point 8 for the balance scale, whereby web 23 carries a wire strain gauge 28 on its bottom. The cross traverse can either be milled out of a metal sheet approximately 10 mm thick or cut out by a laser or it can be manufactured by pressure diecasting.

The cross traverse which forms the two protruding arms 6 is designed exactly like the cross traverse forming the two protruding arms 5. The wire strain gauge fastened in the vicinity of support point 9 for the balance scale on the upper web is designated in the circuit (FIG. 3) by reference numeral 29 and the wire strain gauge in the vicinity of support point 10 is designated by reference numeral 30.

All four wire strain gauged 27, 28, 29, 30 are located at points which are expanded in the same manner upon a central position of the material to be weighed. Therefore, if two wire strain gauges which are located under opposite corners of the balance scale are connected together to a half bridge and supplemented to a full bridge by two fixed resistors 31 which are identical to one another, as is shown in FIG. 3, then the output signal of both bridge circuits is zero upon a central position of the material to be weighed. However, if the material to be weighed is located e.g. closer to support point 10, then wire strain gauge 30 located thereunder is expanded more strongly whereas the opposite wire strain gauge 27 under support point 7 is expanded less. This produces a differential signal on the bridge output which is amplified by amplifier 32. This signal is therefore proportional to the distance of the material to be weighed from the center of the balance scale, namely, in the direction of the diagonal from support point 7 to support point 10. In a corresponding manner, the output signal of the second bridge circuit with wire strain gauges 28, 29 is proportional to the distance of the material to weighed from the center of the balance scale in the direction of the diagonal from support point 8 to support point 9.

This signal, which is proportional to the corner load, can be added with presettable ratings to the output signal of the measured value receiver. In FIG. 3, the current through coil 14 which is supplied from automatic gain control amplifier 38 represents the output signal of the measured value receiver. This current is supplied to input amplifier 39 of the analog-to-digital converter which is connected in as a current drain. A small additional correction current which corrects the corner-load error of the balance is added to this current via rating resistors 36, 37. Resistors 36, 37 are selected in the size corresponding to the magnitude of the corner-load error in the two diagonal directions of the balance scale. In the case of a balance which exhibits e.g. no corner-load error in one direction, the corresponding rating resistance becomes infinite. Depending on the sign of the corner-load error, either a rating resistor 36 and 37 is connected to the output of amplifier 32 and 33 or a rating resistor 36' and 37' is connected to the output of inverter 34 and 35 (sketched in dotted lines in FIG. 3). After assembly and start-up of the balance, the corner-load dependency of the balance is measured in both directions without rating resistors 36, 37, 36' and 37', the required rating resistors 36, 37 calculated thereafter in accordance therewith and built in and the correct corner-load correction monitored.

The circuit shown in FIG. 3 is, of course, only an example of how a presettable fraction of the corner-load signal can be added to the output signal of the measured value receiver. By way of example, a potentiometer can also be connected between the output of amplifier 32 and the output of inverter 34 in which the magnitude of the electric corner-load correction can be set in a stepless manner.

The above-described arrangement of the wire strain gauges at positions which all undergo an expansion or a compression under load and the wiring to two half bridges do result in only a smaller signal than is the case for circuits in which additional wire strain gauges with the opposite direction of load are used; however, they reduce the expense for wire strain gauges by one half. Since the corner-load errors of customary parallel guides generally do not exceed a few 100 digits, the obtainable resolution of this simplified circuit is sufficient.

FIG. 2 furthermore indicates housing 71 in a fragmentary fashion. The weighing system is built into the housing in such a manner that end parts 17, 18 are located with a slight spacing above the base plate of the housing. In the case of an overload of the balance, end parts 17, 18 are supported on stops 74 on the base plate of the housing and transfer the overload in this manner into the housing. In addition to this mechanical overload protection, a limit value detector (not shown) can also be connected in the electronic wiring in FIG. 3 to the outputs of each of amplifiers 32, 33, 34 and 35 which detector regulates e.g. a symbol in the display for an off-center position of the material to be weighed.

Figure 4:
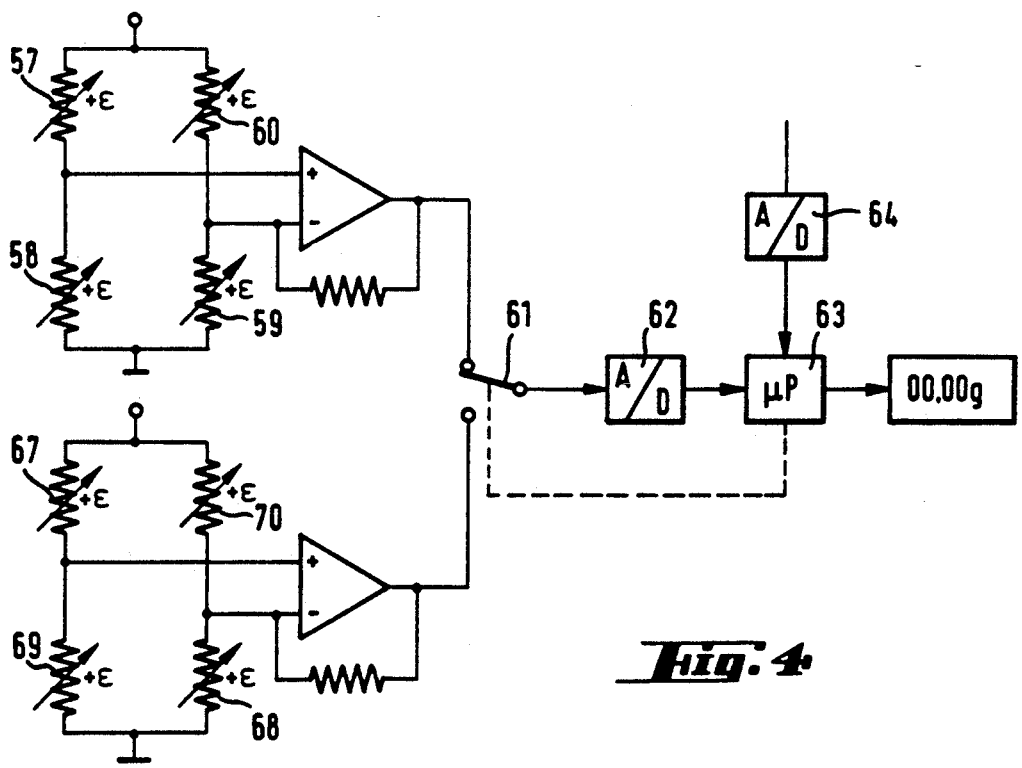
FIG. 4 shows the electric circuitry in a second embodiment.

The circuitry of a second embodiment of the electric corner-load correction is shown in FIG. 4 and the cross traverse which forms the two protruding arms 40 and belongs to this embodiment is shown in FIG. 5. This cross traverse is designed similarly to the cross traverse in FIG. 2; however, it carries a total of four wire strain gauges at webs 51, 52 53 and 54 formed by recesses 49, 50 which wire strain gauges are exposed to identical expansions upon being loaded. Wire strain gauges 57, 67 belong to support point 47 of the balance scale and wire strain gauges 58, 68 to support point 48. The mechanical part of this second embodiment corresponds otherwise to the mechanical part of the first embodiment according to FIG. 1. The total of eight wire strain gauges are wired in accordance with FIG. 4 to two full bridges. The position of wire strain gauges 57, 58, 67 and 68 can be recognized from FIG. 5, the other four wire strain gauges are located on the second cross strut, namely, the two wire strain gauges 59, 69 below the support point of the balance scale designated in FIG. 1 by reference numeral 9 and the two wire strain gauges 60, 70 under the support point designated in FIG. 1 by reference numeral 10. The bridge circuit of wire strain gauges 57, 58, 59 and 60 shown at the top in FIG. 4 thus emits a signal if e.g. wire strain gauges 57 and 59 are expanded more strongly than wire strain gauges 58 and 60, if, therefore, the load in FIG. 1 rests more on the left side of the balance scale. On the other hand, if the load rests more on the side of the cross traverse which forms protruding arms 5 in FIG. 1, then the two wire strain gauges 57, 58 are expanded more strongly but equally, whereas the two wire strain gauges 59, 60 are expanded less but likewise equally; thus, the bridge circuit emits not output signal. This bridge circuit therefore reacts only upon a shifting of load on the balance scale in the direction of left to right in FIG. 1. The lower bridge circuit reacts in a corresponding manner in FIG. 4 with wire strain gauges 67, 68, 69, 70 to shifts of the load on the balance scale in the direction of front to back in FIG. 1. These two corner-load signals are supplied in FIG. 4 by multiplexer 61 in an alternating manner to analog-to-digital converter 62 and digitally passed on to microprocessor 63. Microprocessor 63 controls multiplexer 61, so that it can associate the digital signals with the two bridge circuits and therewith with the two directions on the balance scale. Microprocessor 63 also receives the digitized signal of the measured value receiver from analog-to-digital converter 64. A reset fraction of the two corner-load signals can then be added in the microprocessor with known calculating routines to the signal of the measured value receiver. The preset fractions are digitally stored in the form of two corner-load correction factors in the memory of microprocessor 63. The latter are determined after the start-up of the balance precisely like the rating resistances in the first embodiment. In the case of a balance, for example, which exhibits no corner-load error in one direction, the associated corner-load correction factor is zero.

This second embodiment permits a corner-load measurement parallel to the edges of the balance scale by means of the double number of wire strain gauges, which is advantageous for some purposes. In addition, the digital calculation of the corner-load correction also allows a non-linear dependency of the corner-load error to be corrected. For this, only other correction coefficients for quadratic, cubic and, optionally, other powers of the corner-load signal in addition to the (linear) correction factor have to be stored and considered by the computer.

Of course, the circuit with two half bridges described in the first embodiment can also be combined with the analog-to-digital conversion and the digital calculation of the second embodiment. In the same manner, the circuit with two full bridges according to the second embodiment can be combined with the analog electric correction via rating resistors in accordance with the first embodiment.

Figure 6:
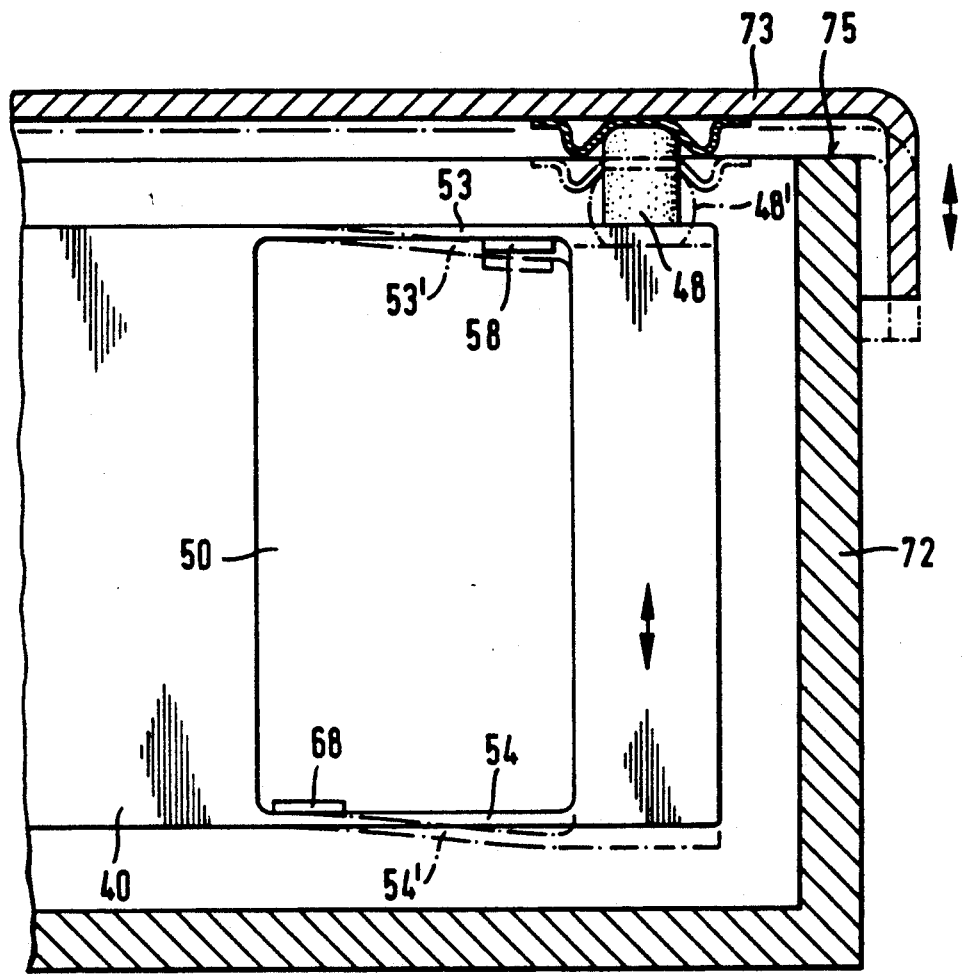
FIG. 6 shows a section through the housing and the support point for the balance scale in the embodiment according to FIG. 5.

Support points 47, 48 for the balance scale are shown in FIG. 5 as rubber buffers. They are intended to deaden impacts onto the balance scale and represent an overload protection in addition, as can be seen from the detailed sketch in FIG. 6. In the case of an overload on balance scale 73, the rubber buffers forming support point 48 are compressed together until balance scale 73 rests on upper surface 75 of housing 72. This overload state with compressed rubber buffers 48' and elastically bent webs 53', 54' is shown in dotted lines in FIG. 6. The resiliency of the rubber buffers, the resiliency of webs 53, 54 and the free space between balance scale 73 and upper edge 75 of the housing are coordinated in such a manner with each other that the balance scale does not rest on upper edge 75 of the housing until the weighing range has been exceeded.

We claim:

1. In an electronic balance with a scale on top, a system carrier (1) fixed to the housing, a load receiver (2) with two guide rods (3/4) which function as parallel guide means connect the load receiver to the system carried in a vertically movable manner with four protruding arms (5, 6; 40) which are fastened to the load receiver and carry supports points points (7, 8, 9, 10; 47, 48) for a balance scale on their ends and with a low travel measured value receiver (14, 15) which is loaded either directly by the force of weight acting on the balance scale or with the interpositioning of a translation lever (11), the improvement comprising in that the protruding arms (5, 6) comprise a central recess (19, 20) in front of their ends (17, 18) so that an upper web (21, 23) and a lower web (22, 24) remain and form a parallel guide for the particular support point (7, 8, 9, 10) of the balance scale, each of the four support points (7, 8, 9, 10) of the balance scale is associated with a wire strain gauge (27, 28, 29, 30) located on one of the associated webs (21, 23), said four wire strain gauges (27, 28, 29, 30) are arranged in such a manner on the webs (21, 23) that they are all stressed or all compressed upon an approximately central loading of the balance scale, said four wire strain gauges (27, 28, 29, 30) are electrically wired to two half bridges and the output signals of the two half bridges are added with presettable values to the output signal of the measured value receiver (14, 15).

2. The electronic balance with scale on top according to claim 1, wherein the protruding arms (40) comprise a central recess (49, 50) in front of their ends so that an upper web (51, 53) and a lower web (52, 54) remain and form a parallel guide for the particular support point (47, 48) of the balance scale, said four support points (47, 48) of the balance scale is associated with two wire strain gauges (57, 58, 59, 60, 67, 68, 69, 70) located on one of the associated webs (51, 52, 53, 54), said these eight wire strain gauges (57, 58, 59, 60, 67, 68, 69, 70) are arranged in such a manner on the webs (51, 52, 53, 54) that they are all stressed or all compressed upon an approximately central loading of the balance scale, said eight wire strain gauges (57, 58, 59, 60, 67, 68, 69, 70) are wired to two full bridges and that the output signals of the two full bridges are added with presettable values to the output signal of the measured value receiver (14, 15).

3. The electronic balance with scale on top according to claim 1, wherein the presettable values take place by means of rating resistors (36, 37, 36', 37').

4. The electronic balance with scale on top according to claim 1 wherein the output signals of the two bridge circuits are digitized and supplied to a microprocessor (63) and that the presettable values are stored as rating factors in the microprocessor (63).

5. The electronic balance with scale on top according to claim 4, wherein the rating takes place in a non-linear fashion.

6. The electronic balance with scale on top according to claim 1 wherein each two protruding arms (5, 6, 40) are combined to a cross traverse.

7. The electronic balance with scale on top according to claim 1, wherein the protruding arms are designed as cast parts.

8. The electronic balance with scale on top according to claim 1, wherein the support points (47, 48) for the balance scale at the ends of the protruding arms (40) are formed by rubber buffers.

9. The electronic balance with scale on top according to claim 1, wherein overload stops (74, 75) are provided on the housing (71, 72).

10. The electronic balance with scale on top according to claim 9, wherein overload signals are derived from the output signals of the bridge circuits.

* * * * *